United States Patent
Cai et al.

(10) Patent No.: US 9,638,736 B2
(45) Date of Patent: May 2, 2017

(54) DC LEVEL DETECTION CIRCUIT BETWEEN HIGH SPEED SIGNAL LINE CONNECTING PORTS, A SYSTEM INCLUDING THE CIRCUIT, AND METHODS OF MAKING AND USING THE SAME

(71) Applicants: Shengzhi Cai, Chengdu (CN); Qiuming Wei, Chengdu (CN); Yuanjun Huang, Chengdu (CN); Yuanzhong Xu, Chengdu (CN)

(72) Inventors: Shengzhi Cai, Chengdu (CN); Qiuming Wei, Chengdu (CN); Yuanjun Huang, Chengdu (CN); Yuanzhong Xu, Chengdu (CN)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 132 days.

(21) Appl. No.: 14/558,622

(22) PCT Filed: Nov. 25, 2014

(86) PCT No.: PCT/CN2014/092121
§ 371 (c)(1),
(2) Date: Dec. 2, 2014

(87) PCT Pub. No.: WO2016/082095
PCT Pub. Date: Jun. 2, 2016

(65) Prior Publication Data
US 2016/0146862 A1     May 26, 2016

(51) Int. Cl.
*G01R 23/20*     (2006.01)
*G01R 31/04*     (2006.01)
*H01L 21/00*     (2006.01)

(52) U.S. Cl.
CPC ........ *G01R 31/045* (2013.01); *G06F 2101/00* (2013.01); *H01L 21/00* (2013.01); *H01L 2221/00* (2013.01)

(58) Field of Classification Search
CPC ....... H01L 21/00; H01L 2221/00; G06F 1/00; G06F 2101/00; G09G 1/00; G09G 2230/00; G01N 1/00; G01N 2201/00
See application file for complete search history.

(56) References Cited

U.S. PATENT DOCUMENTS 5,517,015 A  *  5/1996  Curry ................... G01K 1/028
                                                   235/492
5,883,476 A  *  3/1999  Noguchi ................ G09G 1/00
                                                   315/368.12
(Continued)

FOREIGN PATENT DOCUMENTS

CN          2930179 Y       8/2007

OTHER PUBLICATIONS

PCT International Search Report and Written Opinion; PCT International Searching Authority/CN dated Aug. 21, 2015; International Application No. PCT/CN2014/092121; 9 pages; International Searching Authority/State Intellectual Property Office of the P.R. China; Beijing, China.

*Primary Examiner* — Jermele M Hollington
*Assistant Examiner* — Temilade Rhodes-Vivour
(74) *Attorney, Agent, or Firm* — Andrew D. Fortney; Central California IP Group, P.C.

(57)     ABSTRACT

A DC level detection circuit between high speed signal line connecting ports and a system using the same in optical communications is disclosed. Corresponding ports of a high speed signal line each have an additional resistor, where one additional resistor has a resistance significantly greater than that of the other resistor. The smaller resistor is grounded. The larger resistor is connected to a DC voltage source, a (Continued)

low pass filter, and a signal detection port. Thus, when both ports of the high speed signal line are connected, a status of the electrical level detected at the signal detection port changes. The circuit detects the connection state of the high speed signal line without negative effects on signal transmission and is applicable to various circuits, especially plug-in modules and corresponding slots. Thus, the circuit further enables signal port multifunctionality, increases module installation accuracy, and provides higher compatibility for plug-in modules.

20 Claims, 5 Drawing Sheets

(56) References Cited

U.S. PATENT DOCUMENTS

| | | |
|---|---|---|
| 2004/0252566 A1 | 12/2004 | Chang et al. |
| 2005/0002518 A1* | 1/2005 | Daw .................. H04M 3/2272 379/413 |
| 2005/0040864 A1* | 2/2005 | Ficken .................. H03K 5/08 327/65 |
| 2006/0104000 A1* | 5/2006 | Yuhara .................. H02H 9/046 361/93.1 |
| 2008/0055486 A1 | 3/2008 | Chin et al. |
| 2008/0278248 A1* | 11/2008 | Kimura .................. H03L 7/085 331/1 R |
| 2009/0160491 A1 | 6/2009 | Ochiai et al. |

* cited by examiner

US 9,638,736 B2

DC LEVEL DETECTION CIRCUIT BETWEEN HIGH SPEED SIGNAL LINE CONNECTING PORTS, A SYSTEM INCLUDING THE CIRCUIT, AND METHODS OF MAKING AND USING THE SAME

FIELD OF THE INVENTION

The present invention relates to the field of communication, especially to the field of hardware detection in optical communication devices. More specifically, embodiments of the present invention pertain to circuits and methods for detecting a connection status between a plug-in module and a corresponding slot using a port for a signal line.

DISCUSSION OF THE BACKGROUND

At present, to simplify assembling and disassembly, slot interfaces are broadly applied to plug-in type modules and main boards in electrical communication. The interface of a plug-in type module employs one or more plugs corresponding to one or more slots, one of which is known as a "golden finger." A "golden finger" refers to the contact segment of a slot that includes a plurality of conductive metal (typically gold) contacts. These contacts may be arranged as and/or have the appearance of fingers, so they are known as "golden fingers." Golden fingers have a high conductivity and are utilized to connect the internal circuit of a module with a main board via the socket of the main board. In general, to determine whether modules and main boards are in good electrical connection, a special detection port is provided. The special detection port is configured to check whether a plug-in type module is plugged in properly by a circuit on the main board that detects a voltage status at the special detection port. In some particular cases, connection status detection ports on a module may be used by other circuits or functionality for high speed signal transmission. However, determining whether a module is properly plugged in using a voltage in the detection port can have an adverse effect on installation and usage of the module.

This issue can be rather serious when two or more modules having the same function are integrated. For example, in optical communication, Pin6 in a conventional SFP module is a pin for connection detection. When a SFP module is properly plugged in a client-side main board, the circuit on the client-side main board can determine the hardware connection status from the detected voltage on Pin6. When a low electrical level is detected at Pin6, it indicates the whole SFP function module has been plugged in properly, and the hardware is available. Otherwise, the hardware is unavailable, and reconnection is required. When two SFPs are integrated into one CFSP, the external Pin6 of the CFSP becomes the TD2− interface of channel 2 as a high speed signal input port. In such a configuration, determining whether a CSFP module is properly plugged into a client-side main board based on the detected electrical level status is no longer appropriate. Furthermore, single channel CSFP modules have no original detection port that can make the module hot-pluggable.

In addition, XFP modules include a detection port MOD-ABS capable of making the module hot-pluggable (when a voltage detected at the detection port is low, that indicates the module is in good contact). However, with recent developments in module utilization, there is a possibility of the MOD-ABS port being occupied. Thus, a need is felt for a method to achieve functionality multiplexing of high speed signal ports, to achieve both high speed signal transmission and detection for hardware connection at such ports.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide a DC level detection circuit and multiple functionality to high speed signal ports, thereby accomplishing high speed signal transmission and detection of hardware connection using some or all of the same circuitry. In order to achieve the present objective(s), the present invention provides a DC detection circuit connected to a high speed signal line, the detection circuit comprising a first resistor, a second resistor, a low pass filter, and a signal detection port. One end or terminal of the first resistor is connected to a ground potential, while another end or terminal is connected to a first port of the high speed signal line. One end or terminal of the second resistor is connected to a DC voltage source VCC, and another end or terminal is connected to a second port of the high speed signal line. One node or terminal of the low pass filter is connected to the signal detection port, and another node or terminal is connected to the second port of the high speed signal line. The first and second ports of the high speed signal line may comprise corresponding or matching ports of a plug-in module and a slot in a module-receiving device (e.g., in which the first port transmits or receives the same signal respectively received or transmitted by the second port). The resistance of the second resistor may be equal to or greater than 5 times the resistance of the first resistor. The present detection circuit can be applied to plug-in type modules and corresponding slots for detecting the connection status between the plug-in type module and the slot.

In order to comply with one or more Multi-Source Agreement (MSA) standards for optical transceivers, the DC voltage source (VCC), the resistance of the first resistor, and the resistance of the second resistor must meet the conditions $Vcc*[R1/(R1+R2)]<0.8V$ and $R1*50/(R1+50)>40$. In the MSA standard(s), a voltage lower than 0.8V is defined as a low electrical level (e.g., a "low level"), and a voltage higher than 2V is defined as a high electrical level (e.g., a "high level"). When the signal detection port detects a voltage value V (where $V=Vcc*[R1/(R1+R2)])<0.8V$ after the circuit is connected, the MSA standard can be met.

The low pass filter may comprise a third resistor and a capacitor in series, where a first electrode of the capacitor is connected to a ground potential, and a terminal of the third resistor is connected to the second port of the high speed signal line. In order to detect a low level (e.g., from the first resistor when both ports of the high speed signal line are connected), the high speed signal(s) at these ports should be filtered to prevent negative or adverse effects on low level signal detection.

In one embodiment, the first port is a high speed signal port of a plug-in type module, and the second port is a high speed signal port of a slot corresponding to the high speed signal port of the plug-in type module. The simplest and most reliable way to connect a DC voltage source (e.g., VCC) with a signal detection circuit for signal ports is to use a main board with a slot. Alternatively, the second port can be on the plug-in module, and the first port can be in the corresponding slot.

Furthermore, in some embodiments, if the electrical level detected by the detection circuit is low, that indicates the high speed signal ports of the plug-in module and the corresponding slot are connected, or functional. In the prior art, the voltage on the special detection port of the plug-in type module being at a low level is defined as a normal connection, so this definition of electrical level status detection is compatible with existing standards and regulations in the prior art. In further embodiments, the signal detection port of the detection circuit may be connected to an individual high speed signal input terminal of a single-ended or differential signal line between the plug-in type module and the slot.

When a plug-in type module is plugged into a corresponding slot, the golden finger of the plug-in type module is also accordingly connected to an electrical terminal in the slot such that the high speed signal port of the plug-in type module is electrically joined to the first resistor, the second resistor, the low pass filter, and the signal detection port in the corresponding slot. As the resistance of the first resistor is much less than the resistance of the second resistor, the voltage detected by the signal detection port is a low voltage. This indicates that the connection between the plug-in type module and the slot is normal (or functional) and in place, and hardware in the plug-in type module is available. On the contrary, if a low electrical level cannot be detected, the voltage detected by the signal detection port is considered to be a high level (e.g., the DC voltage provided by the second resistor). This indicates the connection between the plug-in type module and the slot is abnormal (e.g., unconnected or not functional), and hardware in the plug-in type module is unavailable.

Furthermore, the plug-in type module may be a small form factor pluggable module (e.g., an XFP module, SFP module, SFP+ module, CSFP module, QSFP module, etc.). The present detection circuit provides a solution for the MOD-ABS port of an XFP module being occupied. Furthermore, when the plug-in type module is a CSFP module, the detection circuit achieves and/or enables CSFP high speed port multiplexing (e.g., dual functionality).

Furthermore, the plug-in type module can be a CSFP module configured to provide (e.g., including) high speed signal port (e.g., TD and/or RD) function multiplexing. The present module connection detection circuit can provide single channel CSFP modules with a connection detection port without negative or adverse effects on high speed signal transmission (e.g., by multiplexing the high speed signal ports TD and/or RD). The CSFP module can be a dual-channel CSFP module configured to detect a connection status at a dual-channel CSFP high speed port, instead of a dual-channel CSFP module occupying the MOD-ABS pin and/or port (e.g., similar to or the same as the original SFP standard interface) which may not have a detection port to detect the module connection status.

In some embodiments, the CSFP high speed port can be a TD2− port (e.g., in a dual-channel CSFP module). As Pin6 is employed as the TD2− port in one embodiment of the dual-channel CSFP, and Pin6 corresponds to the MOD-ABS pin/port in the original SFP module interface, multiplexing the TD2− port of dual-channel CSFP module can provide a solution for connection detection for dual-channel CSFP modules, maintain high speed signal transmission at the TD2− port, and achieve compatibility with SFP-compatible slots. However, the CSFP high speed signal port including the connection status detection circuit can be a TD1−, TD1+, RD2− or RD2+ port of a single- or dual-channel CSFP module. The present connection status detection circuit is suitable for multiplexing connection detection and signal transmission functions of various high speed signal lines and/or ports.

In one implementation, the resistance of the second resistor is about 5 KΩ (e.g., 4.7 KΩ), and the resistance of the first resistor is about 500Ω (e.g., 511Ω). In a further or different implementation, the resistance of the third resistor is about 10KΩ (e.g., 10KΩ), and the capacitance of the capacitor is about 0.1 μF (e.g., 0.1 μF).

The DC supply voltage on the second resistor (e.g., VCC) may be 3.3V or 5V. A DC supply voltage of 3.3 or 5V is common in the prior art. When VCC is equal to another value (e.g., a value of at least 2.5V, but less than 5V), the above-mentioned connection detection function can be achieved if the threshold judgment of a high or low electrical level (e.g., according to an industry standard) can be met.

A high speed signal line (function) multiplexing method according to the present invention (e.g., which may use the above-mentioned detection circuit) may comprise (a) attaching one end or terminal of a first resistor to a first port of a high speed signal line, and connecting another end or terminal of the first resistor to a ground potential, (b) connecting one end or terminal of a second resistor to a second port of the high speed signal line and to a low pass filter, and connecting another end or terminal of the second resistor to a DC voltage source (e.g., VCC); (c) connecting another end or terminal of the low pass filter to a signal detection port or circuit; (d) connecting the first and second ports of the high speed signal line (e.g., to form an interface bleeder circuit), then determining a signal connection status or (electrical) level using the signal detection port or circuit; and (e) determining that the high speed signal line is on or connected when the (electrical) level status is low, and that the high speed signal line is off or unconnected otherwise. The method may further comprise reconnecting the first and second ports when the high speed signal line is off or unconnected. Furthermore, steps (a) and (b) can be performed in any sequence. The resistance of the second resistor may be equal to or greater than 5 times the resistance of the first resistor.

Furthermore, when the signal detected by the signal detection port changes from a high level to a low level, it indicates that the high speed signal line is on or connected. Before either end of the high speed signal line is on, the signal detected by the signal detection port or circuit is at a high level or status (e.g., equal to VCC). When both ports are on or connected, the first and second resistors form a bleeder circuit, and the detected voltage (VD)=VCC*[R1/(R1+R2)]. When R2>>R1, VD<VCC/6 (or more)<0.8V, and the signal detected by the signal detection port or circuit is at a low level.

A connection status detection device or circuit (e.g., configured to detect a connection status between high speed signal line connecting ports) may be configured to detect a connection between high speed line connecting ports using the above-mentioned detection circuit. Therefore, an optical, electrical or photoelectrical communication device may comprise the above-mentioned detection circuit, connected to a high speed signal line and/or port. The above-mentioned detection circuit can be applied to all high speed signal communications, and the communication device can be an optical, electrical or photoelectrical communication device.

A connection test between high speed signal line connecting ports using the above-mentioned high speed signal line connection detection circuit may detect the connection status between connecting ports of a high speed signal line. Hardware detection of or for a plug-in type module using the above-mentioned high speed signal line connection detection circuit is configured to test the connection status between a plug-in type module and a corresponding slot. The method uses one or more high speed signal line pins on a plug-in type module and provides the above-mentioned multiplexing method and/or function to one or more data communication and/or MOD-ABS pins. In this way, when the plug-in type module and the corresponding slot are in good contact, the electrical level detected by the signal detection port or circuit should be low, representing a good or functional connection status between the plug-in type module and the corresponding slot, and indicating that the module hardware is available. On the contrary, when the electrical level is high, it represents a bad or non-functional connection between the plug-in type module and the corresponding slot, and the hardware on the module is unavailable.

Relative to the prior art, the present invention has advantageous effects, including providing a DC level detection circuit and a system including the same that achieves multiplexing of one or more high speed signal line ports, thereby providing both high speed signal transmission and a hardware connection detection function. Electrical level and/or connection status detection can be achieved by adding a resistor to each port of a high speed signal line (e.g., between a plug-in module and a corresponding port), separately having a terminal thereof connected to ground and a DC voltage source (e.g., VCC), and a signal detection circuit or port connected to a resistor having a resistance much greater than that of the other resistor. When both ports of the high speed signal line are connected, the interface of the high speed signal line (e.g., of or between the signal ports) and the two resistors form a bleeder circuit. The signal level or connection status detected by the signal detection circuit or port changes from high to low, thereby determining the connection status of the high speed signal line from the electrical level at the signal detection circuit or port. The present invention can be utilized to detect the connection status of the high speed signal line and/or between a plug-in type module and a corresponding main board slot.

In addition, the third resistor and the capacitor in the low pass filter may be configured to filter high speed signals and/or prevent crosstalk, thereby increasing detection accuracy. The present circuit can provide high speed signal port (function) multiplexing and increase the installation accuracy of plug-in type modules and compatibility of modules including a main board. The above-mentioned electrical connection detection functionality can be added to substantially all high speed signal line connecting ports without adverse or negative effects on high speed signal transmission. As a result, the present invention expands the functionality of high speed signal line connecting ports, and the connection status between high speed signal lines and ports on corresponding modules can be reliably detected. Therefore, the present invention has broad application.

DETAILED DESCRIPTION

Figure 1:
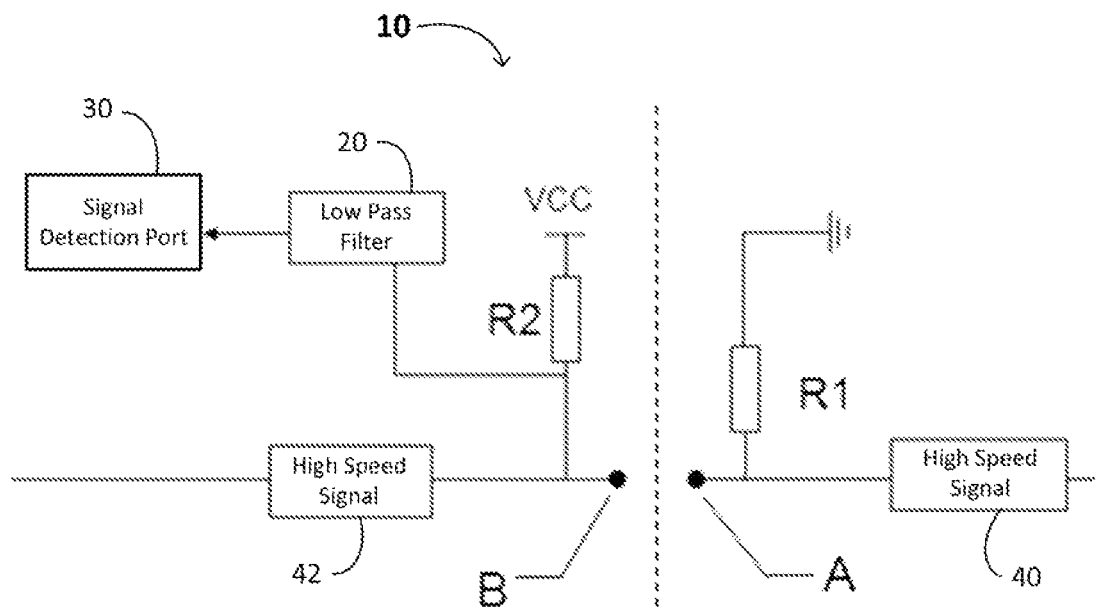
FIG. 1 is a diagram showing a disconnection (e.g., a disconnected detection circuit) between high speed signal line ports in accordance with an embodiment of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic blocks, functional blocks, processing, and other symbolic representations of operations on code, data bits, or data streams within a computer, transceiver, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or circuit. It has proven convenient at times, principally for reasons of common usage, to refer to these signals as bits, streams, values, elements, symbols, characters, terms, numbers, or the like, and to their representations in computer programs or software as code (which may be object code, source code or binary code). It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring a signal or optical signal, respectively, from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

The present invention provides a DC level detection circuit configured to detect a connection status between ports of a high speed signal line, achieving function multiplexing of one or more high speed signal line ports, thereby providing high speed signal transmission and a detection function for hardware connection. The present invention also concerns a system including the level detection circuit and methods of making and using the same.

Spot electrical level status detection can be achieved by adding one resistor to each port of a high speed signal line (e.g., between different devices), respectively having one terminal connected to a ground potential and a DC voltage source VCC, wherein one resistor is connected to a signal detection circuit or port, and the resistance of that resistor is at least 5 or 6 times greater than that of the other resistor. When the high speed signal line is connected, the interface circuit including the resistors and the high speed signal line connecting ports form a bleeder circuit. The connection status of the high speed signal line is then determined by the electrical level at the signal detection port (e.g., the connection status is functional or connected when the signal level status detected by the signal detection circuit or port changes from high to low).

The signal detection circuit may comprise a low pass filter and a signal detection port, and the low pass filter may further comprise a third resistor and a capacitor. In addition, the capacitor and the third resistor are in series, one electrode of the capacitor is connected to a ground potential, and one terminal of the third resistor is connected to the second port of the signal line. In order to detect a low electrical level from the first resistor when the ports of the high speed signal line are connected, signals at the second signal port should be filtered to prevent negative or adverse effects on the ability of the signal detection port to detect a low electrical level.

It's worth noting that while the high speed signal line generally has an original DC-block, the signal being transmitted over the high speed signal line may have no DC component. Thus, the DC voltage detected at the junction of the first and second resistors by the signal detection port of the detection circuit in accordance with the present invention may not be affected by a DC component from the high speed signal line. When the signal being transmitted over the high speed signal line contains a DC component, a DC-block (e.g., a DC offset compensation circuit) may be added to the high speed signal connecting port to filter or compensate for the DC component, and then the detection circuit connected to the high speed signal connecting port can detect a low electrical level from the first resistor. In this way, the detection result is more reliable and accurate.

The present connection detection circuit has no negative or adverse effect on high speed signal transmissions over the high speed signal line, thereby achieving function multiplexing of the high speed signal line. Accordingly, this circuit can be applied to plug-in type modules having high speed signal line ports or the corresponding slots, and provide effective connection detection for plug-in type modules and functional expansion of ports in plug-in type modules. Also, the present connection detection circuit can be applied to communication devices having high speed signal line ports, including optical, electrical or photoelectrical communication devices.

The present connection detection circuit can be utilized to detect the connection status between high speed signal ports of a plug-in type module and its corresponding slot. According to different predetermined positions of the signal detection port and the DC voltage source VCC, the first port of the high speed signal line can be defined as a high speed signal port of the plug-in type module, and the second port can be accordingly defined as a port in the slot. Descriptions of various embodiments of the present connection detection circuitry and system follow.

Exemplary Level Detection Circuits and Method(s) of Making and Using the Same

Figure 2:
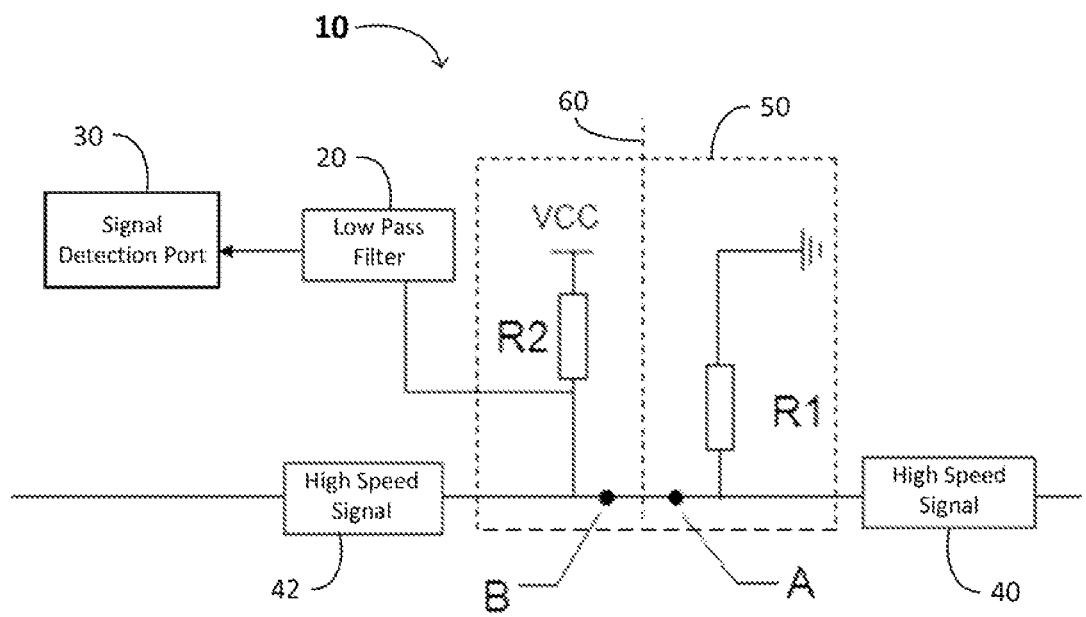
FIG. 2 is a diagram showing a connection detection circuit between high speed signal line ports in accordance with an embodiment of the present invention.

As shown in FIGS. 1-2, a DC level detection circuit 10 between high speed line connecting ports A and B comprises a first resistor R1, a second resistor R2, a low pass filter 20, and a signal detection port 30. One end or terminal of the first resistor R1 is connected to the first port A of the high speed signal line 40 (e.g., in one of the plug-in module and the slot), and another end or terminal is grounded. One end or terminal of the second resistor R2 is connected to the second port B of the high speed signal line 42 (e.g., in the other of the plug-in module and the slot), and another end or terminal is connected to a DC voltage source VCC. One terminal of the low pass filter 20 is connected to the signal detection port 30, and another terminal of the low pass filter 20 is connected to the second port B of the high speed signal line. The resistance of the second resistor R2 is at least 5 or 6 times the resistance of the first resistor R1. When the ports A and B are not connected, as shown in FIG. 1, the electrical level detected by the signal detection port 30 is high (i.e., VD=VCC).

When the first port A and second port B of the high speed signal line 40, 42 are linked or connected, as shown in FIG. 2, the circuit 10 forms a bleeder circuit 50 at the interface 60 (which may be defined by the first port A and second port B). Meanwhile, because the resistance of R2 is far greater than the resistance of R1, the electrical level VD detected by the signal detection port 30 is low (VD=VCC*[R1/(R1+R2)]). After a low electrical level is detected and/or the connection status is determined to be on or functional, the bleeder circuit 50 can be disabled by disconnecting one or more of the voltage source VCC, ground potential, first resistor R1, and second resistor R2 (preferably one of [i] the voltage source VCC and the second resistor R2, and one of [ii] the ground potential and the first resistor R1) using one or more switches (not shown) inserted between a resistor and the corresponding port, voltage supply, or ground potential. A switch between the second resistor R2 and the second port B can disconnect the second resistor R2, the low pass filter 20, and the signal detection port 30, or only the second resistor R2 (and the voltage source VCC).

In one embodiment, the DC voltage source VCC and the signal detection port 30 are connected to signal port B in a slot, and the slot (which is, in turn, in a device actively receiving AC or DC electrical power, such as a host device) is utilized to provide a power supply and signal detection capability to the circuitry in the slot. However, the connection and operation is simple and compatible with the prior art, as main boards (e.g., operably and/or electrically connected to the slot) generally always have original DC voltage source ports, and signal detection can be easily implemented on such main boards.

Figure 3:
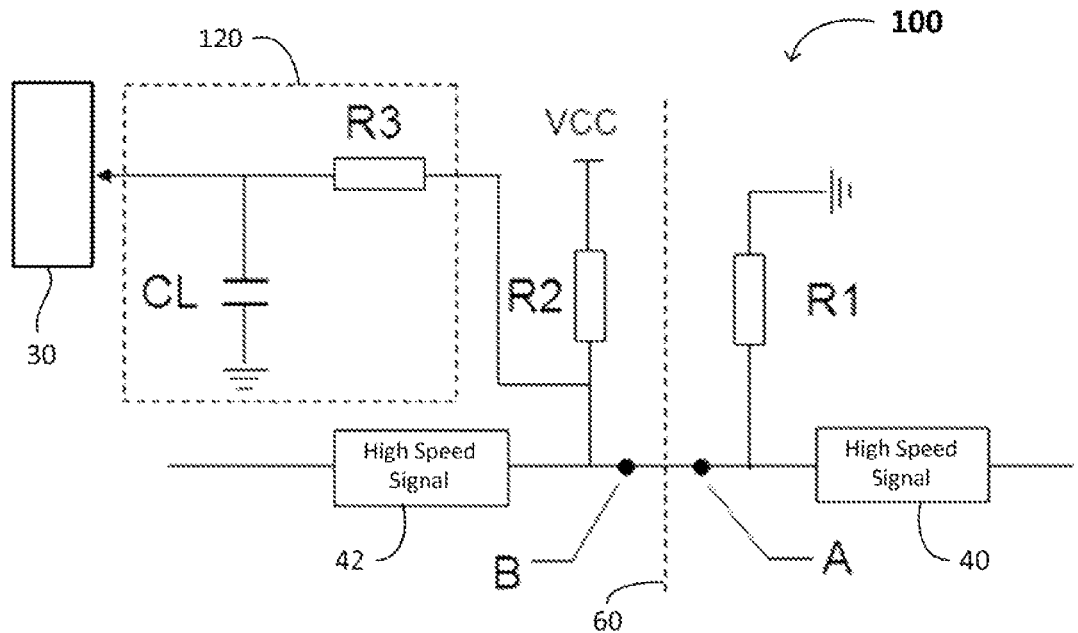
FIG. 3 is a block diagram of the high speed signal port connection detection circuit showing an exemplary a low pass filter in accordance with another embodiment of the present invention.

In one embodiment, the low pass filter 120 comprises a third resistor R3 and a capacitor CL, as is clearly shown in FIG. 3. In the level detection circuit 100, the third resistor R3 has a first terminal connected to the signal port B (e.g., to the node to which a terminal of the second resistor is connected) and a second terminal connected to an electrode of capacitor CL and/or an input of the signal detection port 30. In further embodiments, the third resistor may be replaced by two resistors in series, and the capacitor CL may be connected to the node between the two resistors or to the input of the signal detection port 30.

Figure 4:
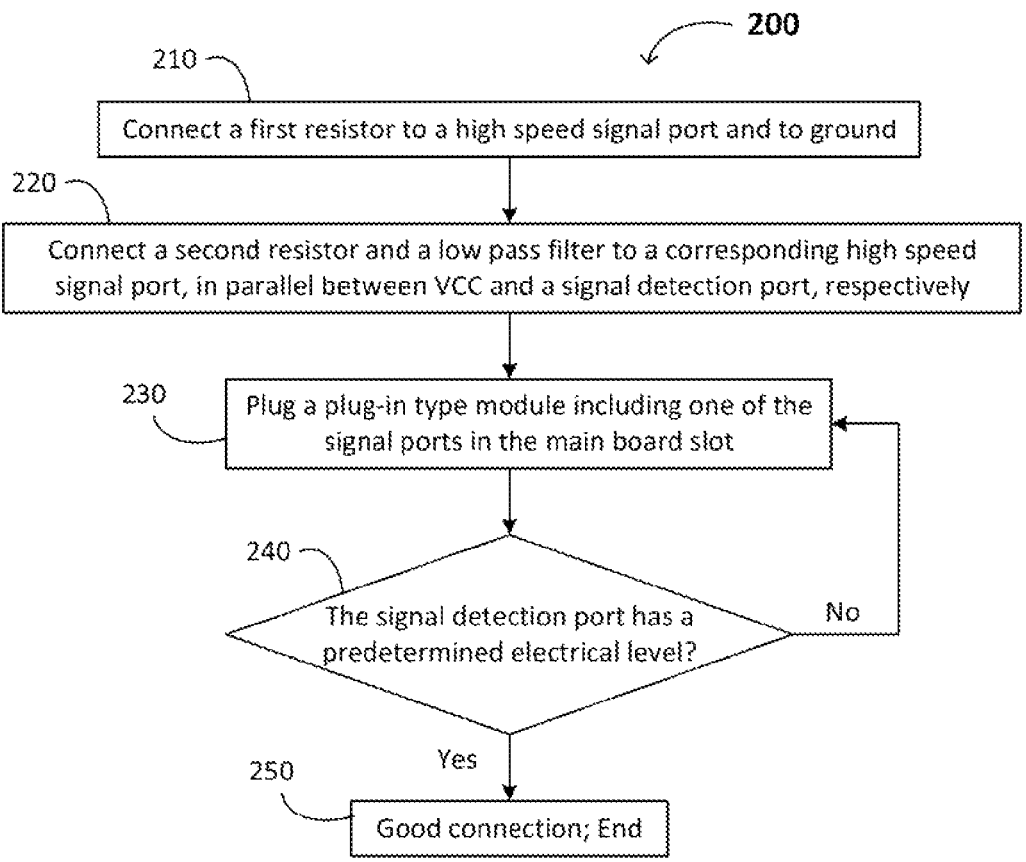
FIG. 4 is a flow chart for an exemplary method of determining a connection status of signal ports (e.g., between a plug-in module and a corresponding slot) in accordance with an embodiment of the present invention.

An exemplary method 200 of designing and using the exemplary level and/or connection detection circuit is shown in FIG. 4. At 210, the exemplary method 200 connects a high speed signal port (e.g., of a plug-in type module) to a first terminal of a first resistor (e.g., R1) having a relatively small resistance, and connecting another terminal (e.g., a second or opposite terminal) of the first resistor to a ground potential. The ground potential may be a ground plane, a virtual ground, or other voltage source providing a substantially stable voltage of 0 V.

At 220, the corresponding signal port (e.g., of a slot corresponding to the plug-in type module) is connected in parallel to a second resistor (e.g., R2) and a low pass filter. The second resistor has a relatively greater resistance than the first resistor. Another terminal (e.g., a second or opposite terminal) of the second resistor is connected to a DC voltage source (e.g., VCC), and the low pass filter is connected at another terminal (e.g., an output node) to a signal detection port.

At 230, the plug-in type module including one of the first and second resistors (preferably, the first resistor connected to ground) is inserted or plugged into its corresponding slot to form an interface circuit. At 240, the method then determines the high speed signal connection status based on the electrical level (e.g., voltage) detected by the signal detection port. When the plug-in type module is plugged into a corresponding slot, the golden finger of the plug-in type module is also aligned with a corresponding connector in the slot such that the high speed signal port (e.g., the golden finger) of the plug-in type module joins the first resistor R1 to the second resistor R2 and the low pass filter in the corresponding slot when a good or functional electrical connection is made.

When the signal detection port detects a predetermined electrical level (e.g., a low level, for example<0.8 V), the high speed signal line is on, connected or functional. The connection status is good or functional, and the method ends at 250. If the predetermined electrical level is not detected, that means the high speed signal line is off, disconnected, or non-functional, and the method 200 returns to 230 to reconnect the plug-in module in the slot.

In order to comply with one or more standards (e.g., one or more MSA standards for plug-in module interfaces), the DC voltage source VCC, the resistance of the first resistor R1, and the resistance of the second resistor R2 must meet the following conditions:

$$Vcc*R1/(R1+R2)<0.8V \quad (1)$$

$$R1*50/(R1+50)>40. \quad (2)$$

Thus, R1 must have a value of at least 200Ω to comply with the MSA standard(s).

In certain MSA standard(s), a voltage lower than 0.8V is defined as a low electrical level, and a voltage higher than 2V is defined as a high electrical level. When the signal detection port detects a voltage value VD=Vcc*R1/(R1+R2) <0.8V after the signal line ports are connected, the level detection circuit complies with the MSA standard(s).

The exemplary method 200 also pertains to function multiplexing of module and/or slot high speed signal ports, and can be broadly applied to high speed signal output ports (which may be single-ended or differential, and if differential, of either polarity, such as TD− or TD+) or high speed signal input ports (which may be single-ended or differential, and if differential, of either polarity, such as RD− or RD+), at one or more channels of a plug-in type module and the corresponding slot in an electrically-powered slot. In some embodiments, the level and/or connection status detection circuitry is present at each data communication channel of the plug-in module and corresponding slot.

A Second Exemplary Embodiment

Figure 5:
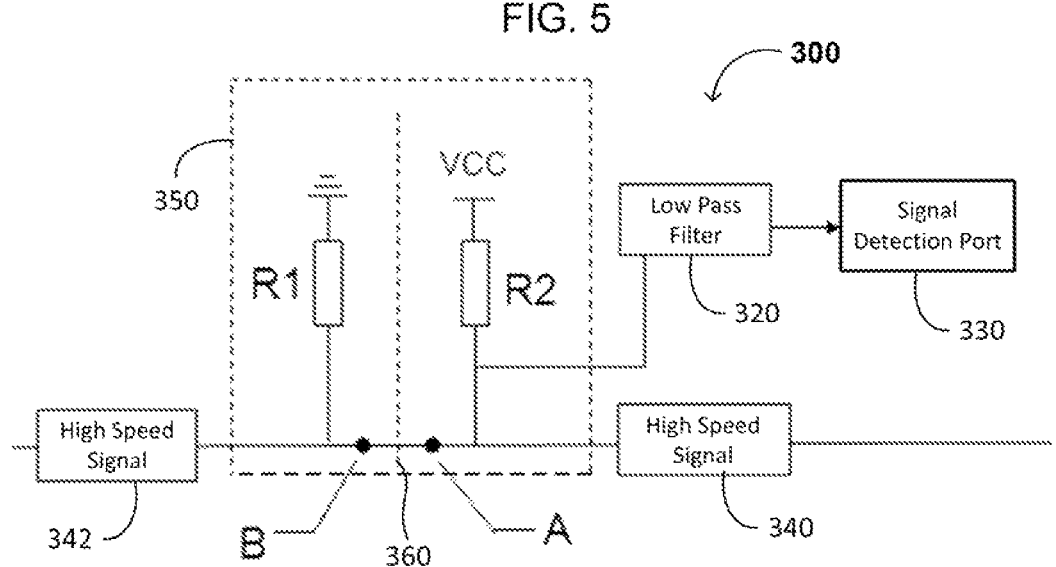
FIG. 5 is a diagram showing an exemplary connection detection circuit between high speed signal line ports in accordance with another embodiment of the present invention.

As shown in FIG. 5, a DC level detection circuit 300 between high speed signal line connecting ports A and B comprises a first resistor R1, a second resistor R2, a low pass filter 320, and a signal detection port 330. One end or terminal of the first resistor R1 is connected to the second port B of a high speed signal line 342, and another end or terminal of the first resistor R1 is grounded. One end or terminal of the second resistor R2 is connected to the first port A of the high speed signal line 340, and another end or terminal of the second resistor R2 is connected to a DC voltage source VCC. The low pass filter 320 is connected (e.g., at its output) to the signal detection port 330, and another terminal (e.g., an input) of low pass filter 320 is connected to the first port A of the high speed signal line 340. The resistance of the second resistor R2 is equal to or greater than 5 or 6 times the resistance of the first resistor R1. The electrical level (VD) detected by the signal detection port 330 is a high voltage, VCC, when the ports A and B are not connected.

When the first port A and second port B of the high speed signal line 340, 342 are linked or electrically connected, the level detection circuit 300 forms a bleeder circuit 350 at the interface 360 (which may be defined by the first port A and second port B). Meanwhile, because R2 is greater than R1 (e.g., by at least 6 times, 8 times, 9 times, 10 times or more), the electrical level VD detected by the signal detection port 330 is VCC*R1/(R1+R2), or a low level.

Furthermore, in order to comply with one or more MSA standards, the DC voltage source VCC, the resistance of the first resistor R1, and the resistance of the second resistor R2 must meet the conditions defined in Equations (1) and (2) above. In certain MSA standard(s), a voltage lower than 0.8V is defined as a low electrical level, and a voltage higher than 2V is defined as a high electrical level. When the signal detection port detects a voltage value V<0.8V after the circuit is connected, the detection circuit complies with the MSA standard(s).

The exemplary embodiment 300 utilizes one or more ports from a plug-in type module to provide power and the signal detection function. While the exemplary embodiment 300 is a little more complicated in operation than the exemplary embodiment 10 of FIGS. 1-2 (e.g., power must be provided to the plug-in module), it is a design that simplifies the design and operation of the hardware housing the slot (e.g., a host device), and enables the module manufacturer to include greater functionality in the module and reduce the burden on the manufacturer of the slot-containing hardware.

The method(s) of designing and using a level and/or connection status detection circuit described with respect to FIG. 4 is/are applicable to the level detection circuit 300 of FIG. 5.

The above-mentioned detection circuits 10, 100 and 300 can be applied to connected status detection for high speed signal line ports in various communication devices, including optical, electrical or optoelectrical devices. The above-mentioned detection circuits 10, 100 and 300 provide function multiplexing of high speed signal line ports and the capability to detect the connection status between various plug-in type modules and corresponding slots. The exemplary embodiments discussed below illustrate various uses of this circuit, but the invention is not limited to these embodiments.

Exemplary Plug-in Modules

In various embodiments, the present detection circuit (e.g., level and/or connection status detection circuit 10 or 100) is applied to a dual-channel CSFP module 410 and a corresponding main board interface. In one example, the detection circuit provides function multiplexing of the high speed signal port TD2− of a dual-channel CSFP module 410 (i.e., Pin6). With the level and/or connection status detection circuit 10 or 100 of FIGS. 1-3, or alternatively, with the level and/or connection status detection circuit 300 of FIG. 5, Pin6 of a CSFP module 410 can provide high speed signal detection and effective connection detection, thereby increasing the installation accuracy of CSFP modules and providing compatibility with SFP slots. In an SFP module 420, Pin6 is defined as a MOD-ABS pin, configured to determine whether the module is plugged in the slot properly (e.g., when a low electrical level is detected at the corresponding pin in the slot), so multiplexing Pin6 of the dual-channel CSFP module 410 (i.e., the high speed signal port TD2−) provides a broader range of applications for dual-channel CSFP modules. Alternatively or additionally, the level and/or connection status detection circuits 10, 100 and 300 (or at least an interface circuit thereof, connected to a single port) can also be applied to the other signal ports of the dual-channel CSFP module 410, such as TD2+, TD1− or RD1+.

As discussed herein, to comply with one or more MSA standards, the DC voltage source VCC, the first resistor R1, and the second resistor R2 (see, e.g., the level and/or connection status detection circuits 100 and 300 of FIGS. 3 and 5) must meet the conditions specified in Equations (1) and (2) above. The first resistor R1 may have a resistance of greater than 200Ω (e.g., from 250Ω to 5000Ω, from 350Ω to 1000Ω, or any value or range of values therein). The second resistor R2 may have a resistance of greater than 2500Ω (e.g., from 3 kΩ to 100 kΩ, from 4 kΩ to 20 kΩ, or any value or range of values therein). In one example, the resistance of the first resistor R1 is about 500Ω (e.g., 511Ω), and the resistance of the second resistor R2 is about 5 kΩ (e.g., 4.7 kΩ). The third resistor R3 may have a resistance of from 3 kΩ to 200 kΩ (e.g., from 5 kΩ to 50 kΩ, or any value or range of values therein). In general, the relative resistances of the first resistor R1 and the third resistor R3 follows the formula: (R1*R3)/(R1+R3) is greater than 200Ω. In one example, the resistance of the third resistor R3 is about 10 kΩ (e.g., equal to 10 kΩ). The capacitance of the capacitor CL may be from to 1 nF to 10 µF (e.g., from 0.01 µF to 1 µF, or any value or range of values therein). In one example, the capacitance of the capacitor CL is about 0.1 µF (e.g., equal to 0.1 µF). Preferably, the DC supply voltage VCC is 3.3 V or 5V.

Figure 6:
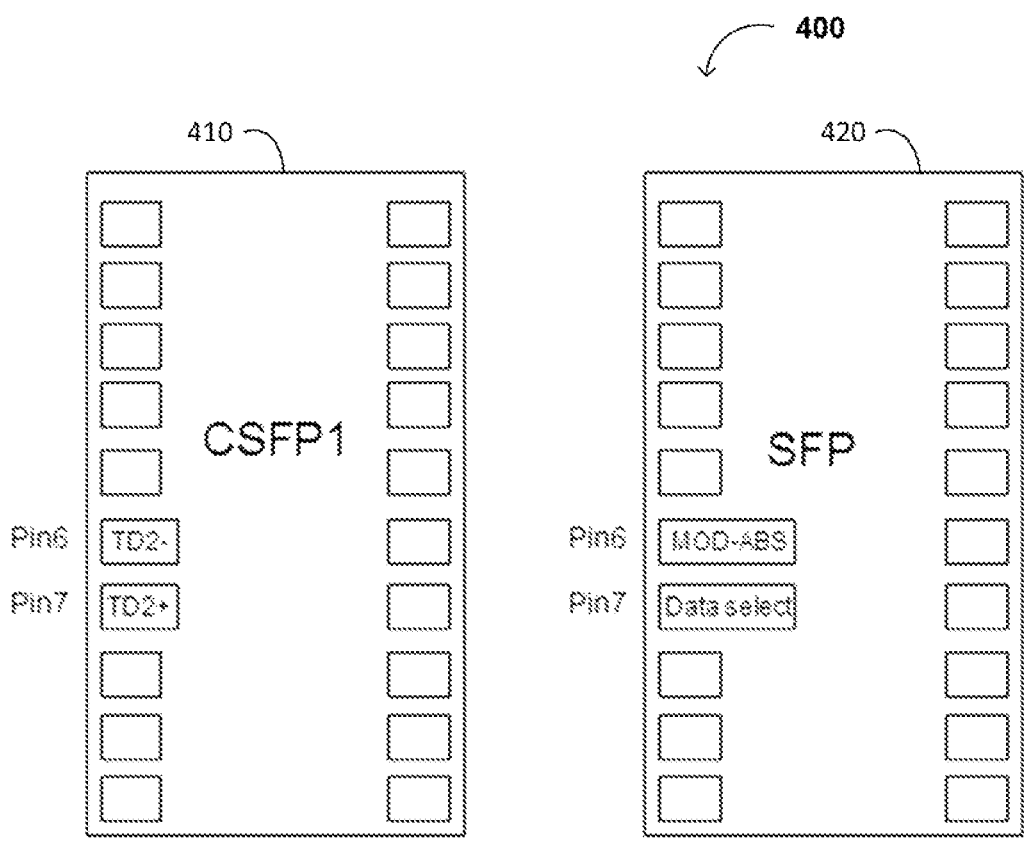
FIG. 6 shows pin definitions of exemplary dual-channel CSFP1 and SFP interfaces in accordance with embodiments of the present invention.

To verify the lack of adverse influence or effect of the present detection circuits 100 and 300 (FIGS. 3 and 5, respectively) on high speed signal transmission over the high speed signal transmission ports of a dual-channel CSFP module (e.g., 410 in FIG. 6), the voltage detected by the signal detection port 30 or 330 can be determined based on Equation (1) above. For a dual-channel CSFP module 410 and a corresponding slot including the detection circuit 100 or 300, in which the resistance of the first resistor R1 is 511Ω, the resistance of the second resistor R2 is 4.7 kΩ, the resistance of the third resistor R3 is 10 kΩ, and the capacitance of the capacitor CL is 0.1 µF, the detected voltage VD=VCC*R1/(R1+R2) according to Equation (1). When VCC=3.3V, VD=0.324 V, and when VCC=5V, VD=0.49 V. Both of these results correspond to a low electrical status as defined by applicable MSA standard(s).

The method(s) of designing and using a level and/or connection status detection circuit described with respect to FIG. 4 is/are applicable to implementation of the level detection circuit 10, 100 or 300 of FIGS. 1-3 and 5 in a CSFP or SFP module and a corresponding slot.

Figure 7:
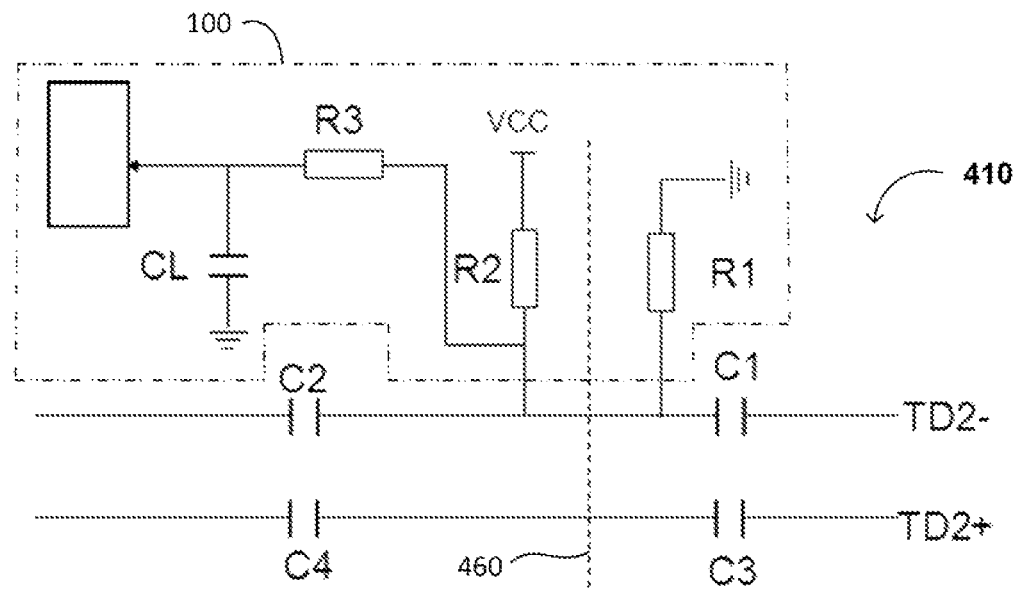
FIG. 7 is a diagram showing a connection detection circuit for high speed signal line ports in accordance with another embodiment of the present invention.

FIG. 7 shows an exemplary application of the detection circuit 100 to the TD2– pin of the CSFP module 410, which is a port in a differential signal line. However, applications of the present level and/or connection status detection circuit to ports in a differential signal line are similar to applications of the circuit to a single-ended signal line, as described above for example with regard to FIGS. 1-3. The differential resistance value (e.g., Zdiff) between pins TD2– and TD2+ (Pin6 and Pin7) of the differential signal line of the dual-channel CSFP module 410 is 95.54Ω when R1, R2, R3 and CL have the values specified in the example of paragraph [0064] above, and VCC is 3.3 V or 5 V. This differential resistance value is in the range of 90Ω-100Ω defined by one or more applicable MSA standard(s) for SFP and/or CSFP modules and slots, indicating that the present detection circuit can be used without adverse effects on signal transmission. The first capacitor C1, the second capacitor C2, the third capacitor C3, and the fourth capacitor C4 shown in FIG. 7 are built-in or specified components of MSA standard-compliant CSFP1 modules and/or interfaces, with standardized or standard-compliant capacitances. The reflectance (e.g., SDD11) of the high speed signal transmission using the detection circuit 100 in FIG. 7, with R1, R2, R3 and CL values specified in the example of paragraph [0064] above, is –32.6 dB (unit ⅟1000), indicating that the reflection loss at the interface 460 barely affects signal transmission on the TD+/TD– line.

Figure 8:
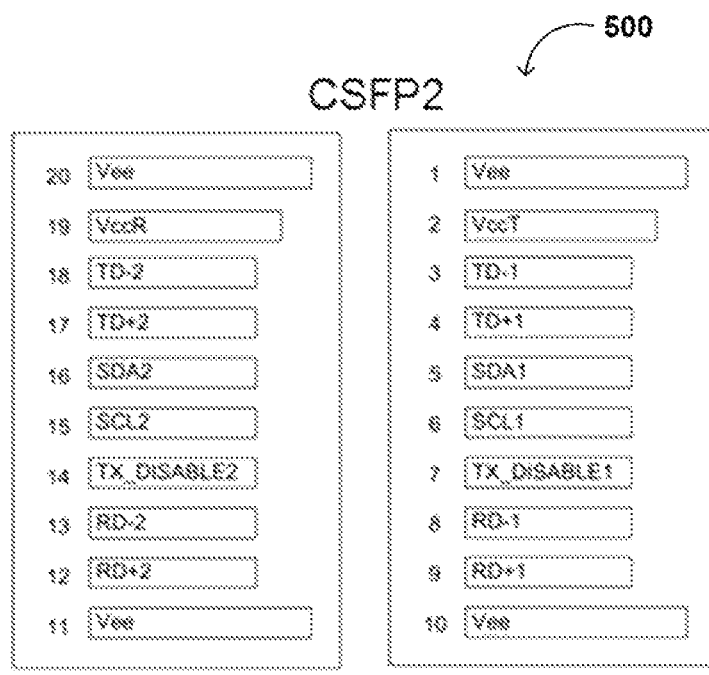
FIG. 8 shows pin definitions of a dual-channel CSFP2 interface in accordance with another embodiment of the present invention.

FIG. 8 shows another dual-channel CSFP module 500 having an interface defined by one or more MSA standards, the CSFP2 interface, that can use the present level and/or connection status detection circuit 10, 100 or 300 at high speed signal line connecting ports in the plug-in module 500 and the corresponding slot. As shown in FIG. 8, the TD2– port of the dual-channel CSFP2 module 500 is Pin18. The present level and/or connection status detection circuit can be applied to Pin18 of the CSFP2 module 500 and the corresponding slot into which the CSFP2 module 500 is inserted, thereby providing function multiplexing of the high speed signal port Pin18. Also, the present level and/or connection status detection circuit can be applied to other high speed signal ports of the dual-channel CSFP2 module 500, such as TD2+ (Pin17), TD1– (Pin3), TD1+ (Pin4), RD2– (Pin13), RD2+ (Pin12), RD1– (Pin8) and/or RD1+ (Ping). The method(s) of designing and using a level and/or connection status detection circuit described with respect to FIG. 4 is/are applicable to implementation of level and/or connection status detection circuit 10, 100 or 300 of FIGS. 1-3 and 5 in the CSFP2 module 500 and a corresponding slot.

Figure 9:
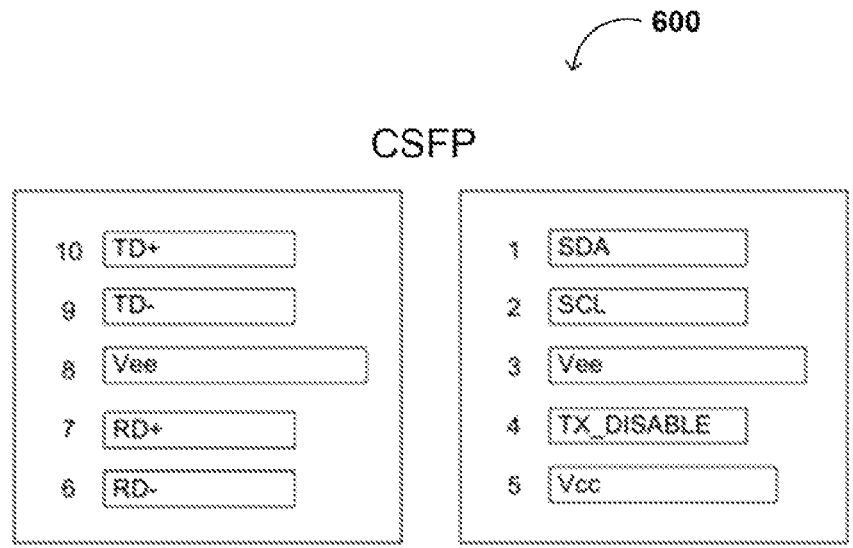
FIG. 9 shows pin definitions of a single channel CSFP interface in accordance with yet another embodiment of the present invention.

FIG. 9 illustrates the pins and/or ports of a single channel CSFP module 600. In embodiments compliant with the CSFP interface, the level and/or connection status detection circuit 10, 100 or 300 is applied to one or more ports of a signal line in the interface between the single channel CSFP module 600 and the corresponding slot, thereby providing function multiplexing of one or more high speed signal ports (e.g., TD+, TD–, RD+ and/or RD–). The single channel CSFP module 600 has no built-in or stand-alone detection port configured to detect or determine the module connection status, but a module connection detection function can be provided by multiplexing a high speed signal port (e.g., adding the present level and/or connection status detection circuit) without adverse or negative effects on high speed signal transmission. The method(s) of designing and using a level and/or connection status detection circuit described with respect to FIG. 4 is/are applicable to implementation of level and/or connection status detection circuit 10, 100 or 300 of FIGS. 1-3 and 5 in the CSFP module 600 and a corresponding slot.

Figure 10:
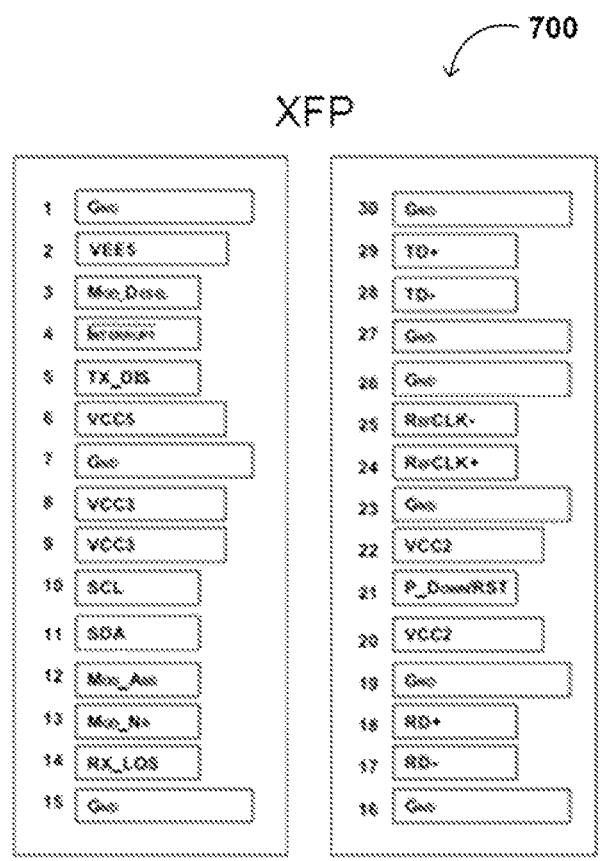
FIG. 10 shows pin definitions of a single channel XFP interface in accordance with still another embodiment of the present invention.

FIG. 10 illustrates the pins and/or ports of a single channel XFP module 700. A standard XFP interface has a built-in or stand-alone detection port MOD-ABS configured to detect or determine a module connection status. However, with increasing utilization of and functionality on the module 700, there is a possibility that the MOD-ABS pin may be occupied or used by another function. The present level and/or connection status detection circuit provides a solution for such modules when the MOD-ABS pin is occupied. In various embodiments, the present level and/or connection status detection circuit is added and/or applied to the interface between the single channel XFP module 700 and the corresponding slot, thereby providing function multiplexing of a high speed signal port (e.g., Pin28, but other ports may be used as well, such as TD+ [Pin29], RD– [Pin17], RD+ [Pin18], SDA [Pin11], SCL [Pin10], TD+ [Pin29], RefCLK– [Pin25], RefCLK+ [Pin24], etc., alone or in combination with TD– [Pin28] and/or one or more other signal ports). The method(s) of designing and using a level and/or connection status detection circuit described with respect to FIG. 4 is/are applicable to implementation of level and/or connection status detection circuit 10, 100 or 300 of FIGS. 1-3 and 5 in the XFP module 700 and a corresponding slot.

CONCLUSION/SUMMARY

Embodiments of the present invention can advantageously provide circuits and methods for detecting a connection status between a plug-in module and a corresponding slot using corresponding ports for a high speed signal line. When a plug-in type module is plugged into a corresponding slot, the high speed signal port of the plug-in type module is also accordingly connected to an electrical terminal in the slot. When the voltage detected by the signal detection port is a low voltage, this indicates that the connection between the plug-in type module and the slot is normal (or functional) and in place, and hardware in the plug-in type module is available. On the contrary, when a low electrical level is not detected, this indicates the connection between the plug-in type module and the slot is abnormal (e.g., disconnected or not functional), and hardware in the plug-in type module is unavailable.

The present invention provides a DC level detection circuit and a system including the same that multiplexes the functionality of one or more high speed signal line ports, thereby providing both high speed signal transmission and a hardware connection detection function. Electrical level and/or connection status detection can be achieved by adding a resistor to each port of a high speed signal line between a plug-in module and a corresponding port, and connecting a signal detection circuit or port to the resistor having a greater resistance than that of the other resistor. When both ports of the high speed signal line are connected, the high speed signal line and the two resistors form a bleeder circuit that changes the signal level detected by the signal detection circuit or port from high to low, thereby determining the connection status of the high speed signal line from the electrical level at the signal detection circuit or port.

In addition, the present invention can increase the installation accuracy of plug-in type modules and the compatibility of modules with slots that includes a main board (e.g., on which the signal port is placed or located). The electrical connection detection functionality can be added to substantially all high speed signal line connecting ports without adverse or negative effects on high speed signal transmission. As a result, the present invention expands the functionality of high speed signal line connecting ports, and the connection status between high speed signal lines and ports in modules and slots can be reliably detected. Therefore, the present invention has broad application.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A detection circuit between signal line connecting ports, comprising:
    a first resistor connected to a first port of the signal line connecting ports and to a ground potential;
    a second resistor connected to a second port of the signal line connecting ports and to a DC voltage source having a voltage VCC, the second resistor having a resistance (R2) at least 5 times a resistance of the first resistor (R1), and the voltage VCC, the resistance R1 and the resistance R2 have values satisfying Vcc*R1/(R1+R2)<0.8V; and
    a low pass filter connected at a first node or terminal to the second port and at a second node or terminal to a signal detection port.

2. The detection circuit of claim 1, wherein when the signal detection port detects a low level, the signal ports are connected, functional or on.

3. The detection circuit of claim 1, wherein said low pass filter comprises a third resistor and a capacitor in series, the capacitor has an electrode connected to a ground potential, and the third resistor is connected to the second port.

4. The detection circuit of claim 3, wherein said signal detection port is connected to a node between the capacitor and the third resistor.

5. The detection circuit of claim 1, wherein said first port is a high speed signal port of a plug-in type module, and said second port is in a slot corresponding to the high speed signal port of said plug-in type module.

6. The detection circuit of claim 5, wherein said plug-in type module is an XFP or CSFP module.

7. The detection circuit of claim 6, wherein said plug-in type module is a dual-channel CSFP module.

8. The detection circuit of claim 7, wherein said first port is a TD2− port of the dual-channel CSFP module.

9. The detection circuit of claim 1, wherein said second port is a high speed signal port of a plug-in type module, and said first port is in a slot corresponding to the high speed signal port of said plug-in type module.

10. The detection circuit of claim 1, wherein said resistance R1 satisfies R1*50/(R1+50)>40.

11. The detection circuit of claim 1, wherein the resistance R2 is greater than 2500Ω, and the resistance R1 is greater than 200Ω.

12. The detection circuit of claim 11, wherein the low pass filter comprises a third resistor and a capacitor in series, the capacitor has an electrode connected to a ground potential and a capacitance of from to 1 nF to 10 μF, and the third resistor is connected to the second port and has a resistance R3 at least 1.2 times greater than the resistance R2.

13. The detection circuit of claim 1, wherein said voltage VCC is 3.3V or 5V.

14. A method of detecting a connection status of a signal line, comprising:
    a) connecting first and second ports of said signal line, the first and second ports respectively having first and second resistors electrically connected thereto, the second port also being connected to a first node or terminal of a low pass filter, the first resistor being connected to a ground potential, the second resistor being connected to a DC voltage source and having a resistance (R2) at least 5 times a resistance of the first resistor (R1), the DC voltage source having a voltage VCC and a second node or terminal of the low pass filter being connected to a signal detection port, wherein the voltage VCC, the resistance R1 and the resistance R2 have values satisfying Vcc*R1/(R1+R2)<0.8V; and
    b) determining an electrical level at the signal detection port, where the connection status of the signal line is connected, functional, or on when the electrical level at the signal detection port is low, and when the electrical level at the signal detection port is not low, the connection status of the signal line is disconnected, nonfunctional, or off.

15. The method of claim 14, further comprising reconnecting the first and second ports when the electrical level at the signal detection port is not low.

16. A hardware detection method for a plug-in type module, comprising the method of claim 14.

17. A data signal line multiplexing method, comprising the method of claim 14, and thereafter, transmitting a data signal from one of the first and second ports to the other of the first and second ports on the data signal line.

18. A method of testing a connection for high speed signal line ports of a high speed signal line, comprising the data signal line multiplexing method of claim 17.

19. An optical, electrical or optoelectrical communication device, comprising the detection circuit of claim 1.

20. The method of claim 14, wherein the resistance R1 satisfies R1*50/(R1+50)>40, said voltage VCC is 3.3V or 5V, the low pass filter comprises a third resistor and a capacitor in series, the capacitor has an electrode connected to a ground potential and a capacitance of from to 1 nF to 10 μF, and the third resistor is connected to the second port and has a resistance R3 at least 1.2 times greater than the resistance R2.

* * * * *